United States Patent
Lyle et al.

(10) Patent No.: US 12,388,675 B2
(45) Date of Patent: Aug. 12, 2025

(54) SYSTEMS AND METHODS FOR POWER MANAGEMENT ON A TRANSPORTATION VEHICLE

(71) Applicant: Panasonic Avionics Corporation, Irvine, CA (US)

(72) Inventors: Christopher H. Lyle, Trabuco Canyon, CA (US); Nirav Patel, Fullerton, CA (US); Glen Gee, Irvine, CA (US); Konstantin Lazarev, Anaheim, CA (US)

(73) Assignee: PANASONIC AVIONICS CORPORATION, Irvine, CA (US)

( * ) Notice: Subject to any disclaimer, the term of this patent is extended or adjusted under 35 U.S.C. 154(b) by 143 days.

(21) Appl. No.: 18/196,945

(22) Filed: May 12, 2023

(65) Prior Publication Data
US 2024/0380635 A1    Nov. 14, 2024

(51) Int. Cl.
*H04L 12/40*         (2006.01)

(52) U.S. Cl.
CPC ............... *H04L 12/40039* (2013.01); *H04L 2012/4028* (2013.01)

(58) Field of Classification Search
CPC ..... H04L 12/40039; H04L 2012/40267; H04L 2012/40273; H04L 2012/4028; G06F 1/26; G06F 1/266; G06F 1/28; G06F 1/32; G06F 1/3215; G06F 2213/0042
USPC ........................ 710/8, 10; 713/320, 321, 340
See application file for complete search history.

(56) References Cited

U.S. PATENT DOCUMENTS

| 10,256,646 | B2 | 4/2019 | Suen et al. | |
| 2022/0200294 | A1* | 6/2022 | Huang | G06F 1/26 |
| 2022/0200452 | A1* | 6/2022 | Koki | G06F 1/28 |

* cited by examiner

*Primary Examiner* — Elias Mamo
(74) *Attorney, Agent, or Firm* — LOZA & LOZA, LLP (57) ABSTRACT

Methods and systems are provided for a transportation vehicle. One method includes configuring a listening threshold value for a Type A, universal serial bus (USB) port on the transportation vehicle; providing an initial power to the USB port without any attached USB device; in response to attaching a USB device to the USB port, detecting an increase in current greater than the listening threshold value; temporarily turning off the initial power to the USB port; setting an operating threshold value, and providing operating power to the USB port; detecting a drop in current when the USB device is disconnected; and resetting the listening threshold value and providing the initial power to the USB port.

20 Claims, 7 Drawing Sheets

SYSTEMS AND METHODS FOR POWER MANAGEMENT ON A TRANSPORTATION VEHICLE

TECHNICAL FIELD

The present disclosure relates to transportation vehicles in general, and more particularly, to innovative technology for power management on transportation vehicles.

BACKGROUND

Transportation vehicles, for example, aircraft, trains, buses, recreation vehicles, boats and other similar vehicles, use various computing/electronic devices (interchangeably referred to as computing devices) for providing various functions, including entertainment, system control, content storage, and other functions. These computing devices include hardware (for example, servers, switches, network interface cards, storage adapters, storage devices, seat devices, smart monitors, and others) and software (for example, server applications, operating systems, firmware, management applications, application programming interface (APIs) and others).

Transportation vehicles today have individualized functional equipment dedicated to a particular passenger seat, which can be utilized by a passenger, such as adjustable seats, adjustable environmental controls, adjustable lighting, telephony systems, video and/or audio entertainment systems, crew communication systems, and the like. For example, many commercial airplanes have individualized video and audio entertainment systems, often referred to as "in-flight entertainment"/"in-flight entertainment and communication" or "IFE"/"IFEC" systems (interchangeably referred to as "IFE").

Type A USB (Universal Serial Bus) ports including outlets are used on transportation vehicles to charge mobile devices and/or to connect to seat devices. There is no efficient way to detect if a Type A USB port is being used by a device. In conventional systems, each Type A USB port is typically provided the same operational power, whether the port is in-use or not. This becomes challenging e.g., on an aircraft power availability can be limited, due to weight, space, and other design constraints. Continuous efforts are being made to develop technology for efficiently detecting use of Type A USB ports and optimizing power consumption and distribution.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary node, the terms "component", "module", "system", and the like as used herein are intended to refer to a computer-related entity, for example, a software-executing processor, hardware, firmware or a combination thereof. For example, a component may be, but is not limited to being, a process running on a hardware processor, a hardware processor, an object, an executable, a thread of execution, a program, and/or a computer.

By way of illustration, an application running on a server and the server can be a component. One or more components may reside within a process and/or thread of execution, and a component may be localized on one computer and/or distributed between two or more computers. Also, these components can execute using one or more non-transitory, computer readable media having data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

Figure 1A:
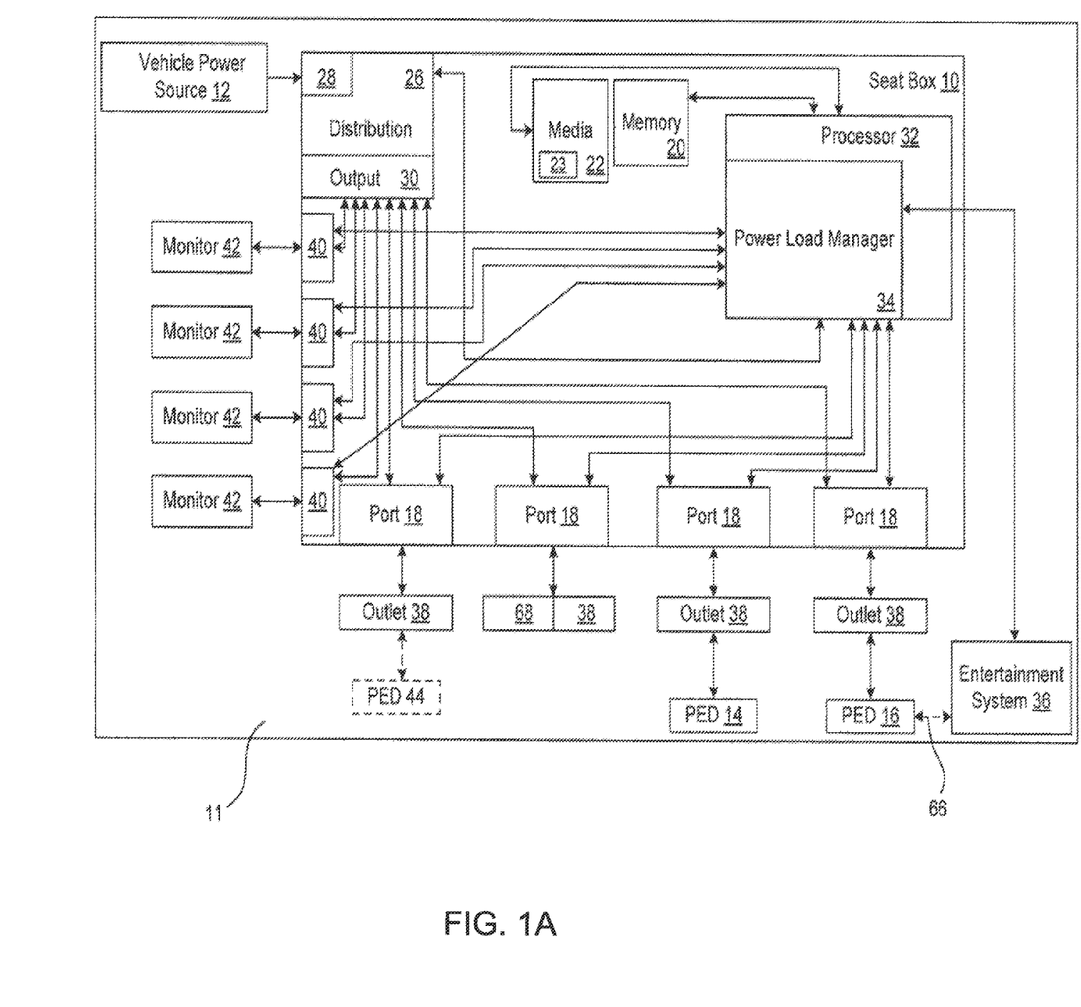
FIG. 1A shows an example of a power management system for a transportation vehicle used according to various aspects of the present disclosure.

Vehicle 11: In one aspect, the following disclosure describes a seat box 10 as schematically illustrated in FIG. 1 for use on a vehicle 11, such as an airplane, ship, train, ferry, bus, or any other type of vehicle. While the seat box 10 is not of any type, it is contemplated that the seat box 10 will provide greater advantages on vehicles where weight is of more importance, such as on busses and trains, and more particularly on aircraft. On an aircraft, the seat box 10 is preferably a line replaceable unit (LRU) that may be replaced with another seat box 10 in the event of a malfunction, defect, or damager thereto.

In one aspect, the seat box 10 receives power from a power source 12 in the vehicle 11, such as an outlet connected to the vehicle electrical system (not shown). The seat box 10 may be of any kind, such as a high-power supply (HPS) type, direct current seat electric box (DC-SEB) type, high definition or 4K premium seat electric box (HD-PSEB or 4K-PSEB) types, or any other type.

When vehicle 11 is an aircraft, it receives AC (alternating current) power at around 115 V and converts the power to 28V, direct current (DC) for distribution to the vehicle electrical system and items connecting thereto. The seat box 10 distributes power among passenger seats on the vehicle, typically a group or row of seats, to power items at each seat, for example, a reading light, flight attendant call light, a monitor, or other items. For example, the seat box 10 receives vehicle power at an input 28 and provides it to a distribution circuitry 26 for distributing the power through an output 30 to various output ports 18 and 40 of the seat box 10. The distribution circuity 26 may also convert the power to a lower voltage, usually from 5 V to 3.3 V.

In another aspect, the conversion can also be performed by outlets 38. That is, electrical power received from the vehicle power source 12 is provided at the same voltage as received at input 28 to each port 18 and to outlets 38 and 68 connected thereto and converted by each outlet to an inclusive range between 5 V to 3.3 V. Power conversion outside of the seat box 10 by the outlets 38 and 68 advantageously reduces heat in the seat box, which may be in area where heat dissipation is difficult such as under a seat or other confined space such as a compartment overhead or in the floor. In alternative configurations, the seat box 10 may receive AC power from the vehicle power source 12 and converts the received power to DC within the seat box 10 via the distribution circuitry 26.

In one aspect, output ports 18 and 40 of the seat box 10 are connected to the distribution circuitry 26. The ports 18 and 40 may be of different types. For example, a first type of port 18 is configured for connection to an outlet (or jack) 38 including a controlled power outlet 38 or a static power outlet 68. Examples of power-controlled outlets 38 are outlet types capable of communicating negotiated power usage and implement USB Power Delivery 3.0 protocol or later. Generally, these outlets have flexibility for a broad range of operability and pass at least current power usage data and power requests from a personal electronic device (PED) 44, 14 or 16 (may also be referred to as USB device 14 or 16) back to the seat box 10. The PEDs 14 or 16 described herein refer generally to electronics devices that use a USB protocol for connectivity and/or charging. The USB protocol for charging include at least USB 2.0/BC1.2, and a protocol or protocols based on USB power delivery.

The power outlets 38 draw power from a source, if permitted to by command/control from the seat box 10. The first type of ports 18 of the seat box 10 may also connect to non-controlled power outlets for example, Type A USB outlets/jacks. The USB Type A outlets can be used for charging a PED 44, 14 or 16, which may be a mobile phone, tablet computer, phablet (larger sized mobile phone nearing tablet-size), laptop computer, or other kind of PED connectable to a USB outlet. In another aspect, USB Type A outlets are used to connect a USB device to a computing device.

FIG. 1A also shows ports 40 that are for vehicles providing monitors (may also be referred to as smart monitors or seat devices) 42 at passenger seats. For instance, the vehicle 11 may include an entertainment system 36 (called an inflight entertainment system or IFE system on aircraft), including monitors 42 mounted at seatbacks, bulkheads, or armrests of seats, for use by passengers The IFE system 36 includes the Series 2000, 3000, eFX, eX2, eXW, eX3, NEXT, and/or any other in-flight entertainment system developed and provided by Panasonic Avionics Corporation (without derogation of any trademark rights of Panasonic Avionics Corporation) of Irvine, California, the assignee of this application.

For vehicle 11 having monitors 42 for passenger use, ports 40 supply the monitors with power. Vehicles used over shorter distances, such as aircraft for short haul flights, may not have monitors 42, in which case the ports 40 are not necessary and may be removed to reduce cost and weight of the seat box 10. If ports 40 are included, the ports preferably report power supplied therefrom to a power load manager 34, described below in detail In another aspect, monitors 40 may also have ports 18, including USB Type A ports that are used to connect and/or charge a USB device (e.g., PED 44, 14 or 16).

In one aspect, each seat box 10 includes a processor 32 and memory 20 connected to the processor via a standard interconnect/bus system (not shown). The bus system may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type. Processor 32 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. Processor 32 may also be a low power type, such as an ARM processor, but may be other types as well, such as an Intel or AMD type processor (without derogation of any third party trademark rights), preferably a type intended for low power or mobile use.

Memory 20 represents any form of random-access memory (RAM), read-only memory (ROM), flash memory, or the like, or a combination of such devices SDRAM, NVRAM. The seat box 10 also includes storage media 22 accessible by the processor 32 for non-volatile storage of data when the vehicle is powered down or power is otherwise not available from the vehicle power source 12. The storage media 22 may be flash memory, a solid-state drive, hard disk drive, or other type of media for non-volatile storage of data. A ROM or EEPROM may be included for non-volatile data storage as well, either alone or in combination with other non-volatile storage media In one aspect, the storage media stores a configuration data structure 23 (which includes a file, an object or any other data format, structured or unstructured). The configuration data structure 23 stores a first threshold value (may also be referred to as a listening threshold value). For example, the first threshold value may be a current value, I1 (e.g., 0.2 A) that is pre-set for a USB Type A outlet for a port that is not in use. I1 defines the minimal initial power that is provided to outlet 38, e.g., 1 W (0.2*5V, where 5V is the voltage provided to each outlet/port). The configuration data structure 23 also includes the initial power limit (P1), which in this example is 1 W.

The configuration data structure 23 also stores an operating (or a second) threshold value and an operating power value. For example, the second threshold value, I2 may be 2.1 A and the operating power (P2) for this example may be 10.5 W (2.1 A*5V). Of course, these current/power levels are only shown as examples and are not intended to limit the scope of the various aspects of the present disclosure.

The processor 32 is connected in communication with each port 18 and 40 of the seat box 10. The processor 32 executes program logic, including a software application referred to hereafter as a power load manager 34. The power load manager 34 uses the configuration data structure 23 to configure the various threshold values described above and allocates the initial power and the in-use, operating power to each outlet.

In one aspect, the power load manager 34 allocates a minimum current level for each port (or outlet, used interchangeably herein), I1, e.g., 0.2 A at a minimum initial power level, P1, e.g., 1 W. Once a USB Type A device is plugged into the port/outlet, the device draws more current than the first threshold value, I1 (e.g., 02A). This triggers a fault and temporarily, the initial power, P1, is turned off. The power load manager 34 receives a notification of the triggered fault and sets the second threshold value, I2, e.g., 2.1 A. The power load manager 34 then provides the operating power, P2 to the port/outlet, e.g., 10.5 W. Once the device is disconnected, the process moves back to where the minimum initial power is provided to the port and the first threshold value, I1 is reset.

Figure 1B:
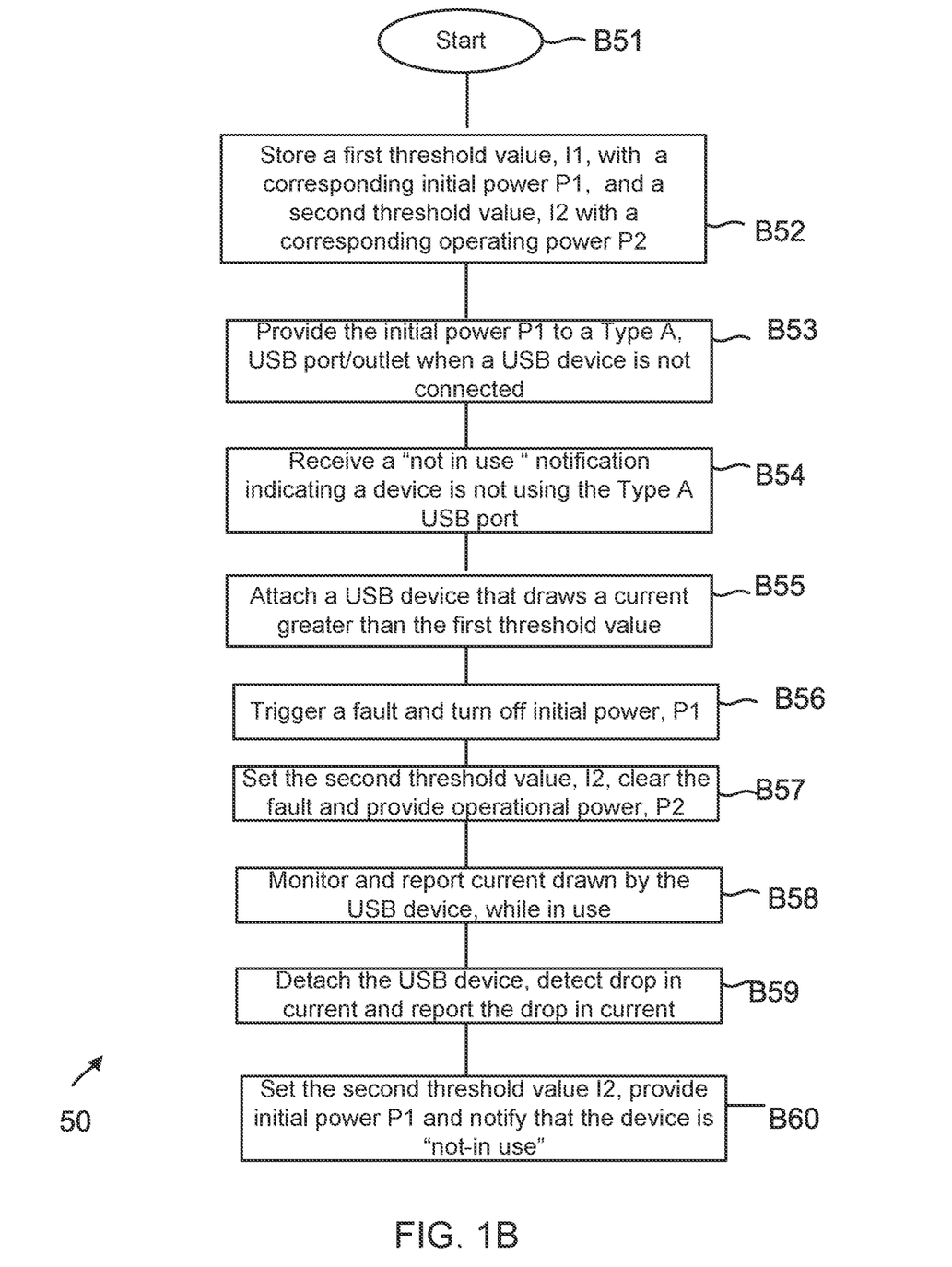
FIG. 1B shows a process flow for power management on a transportation vehicle, according to one aspect of the present disclosure.

Process Flow: FIG. 1B shows a process 50 for detecting a Type A, USB device, according to one aspect of the present disclosure. Process 50 is executed on a vehicle, e.g., an aircraft and executed by a processor, e.g., 32 using the configuration data structure 23 and executable instructions. Process 50 begins in block B51, when the various ports 18/40 and the associated outlets (e.g., 38/68) are installed can be made available for use. As mentioned above some of the ports (18/40)/outlets (38) comply with the USB Type A technical specifications. In block B52, a first threshold value (or a listening threshold value) (I1, e.g., (0.2 A) and a second threshold value) or an operational threshold value (I2, e.g., 2.1 A) is stored in the configuration data structure 23. A corresponding initial power, P1 (e.g., 1 W) and an operational power, P2 (e.g., 10.5 W) is also stored in the configuration data structure 23.

When a Type A USB device is not attached to a Type A USB outlet (38)/port (18 or 40), then in block B53, the power load manager 34 provides an initial power, P1 to the port/outlet, upon receiving a "not in-use" notification from the port/outlet in block B54.

In block B55, a USB device with a Type A connector is plugged into one of the Type A USB port/outlets. The USB Type A device draws a current that is greater than the first threshold value, I1. This triggers a fault in block B56, and the initial power, P1 is turned off. The power load manager 34 receives a device "in-use" notification that means the port/outlet is in use. The power load manager 34 reads the second threshold value I2 and sets the second threshold value for the port in block B57. Furthermore, the fault is cleared and the power load manager 34 provides the operational power P2 to the in-use port/outlet.

In block B58, the power load manager 34 monitors the port/outlet usage. As an example, the current drawn from the port in-use is measured and reported to the power load manager 34. In block B59, the USB device is unplugged. This results in a drop in current usage. The drop in current indicates that the port/outlet is not being used. In block B60, the power load manager 34 turns off the operational power, P2 and resets the first threshold value. Thereafter, the initial power, P1 is provided to the port/outlet. Process 51 then repeats, when a USB device is attached again.

Figure 1C:
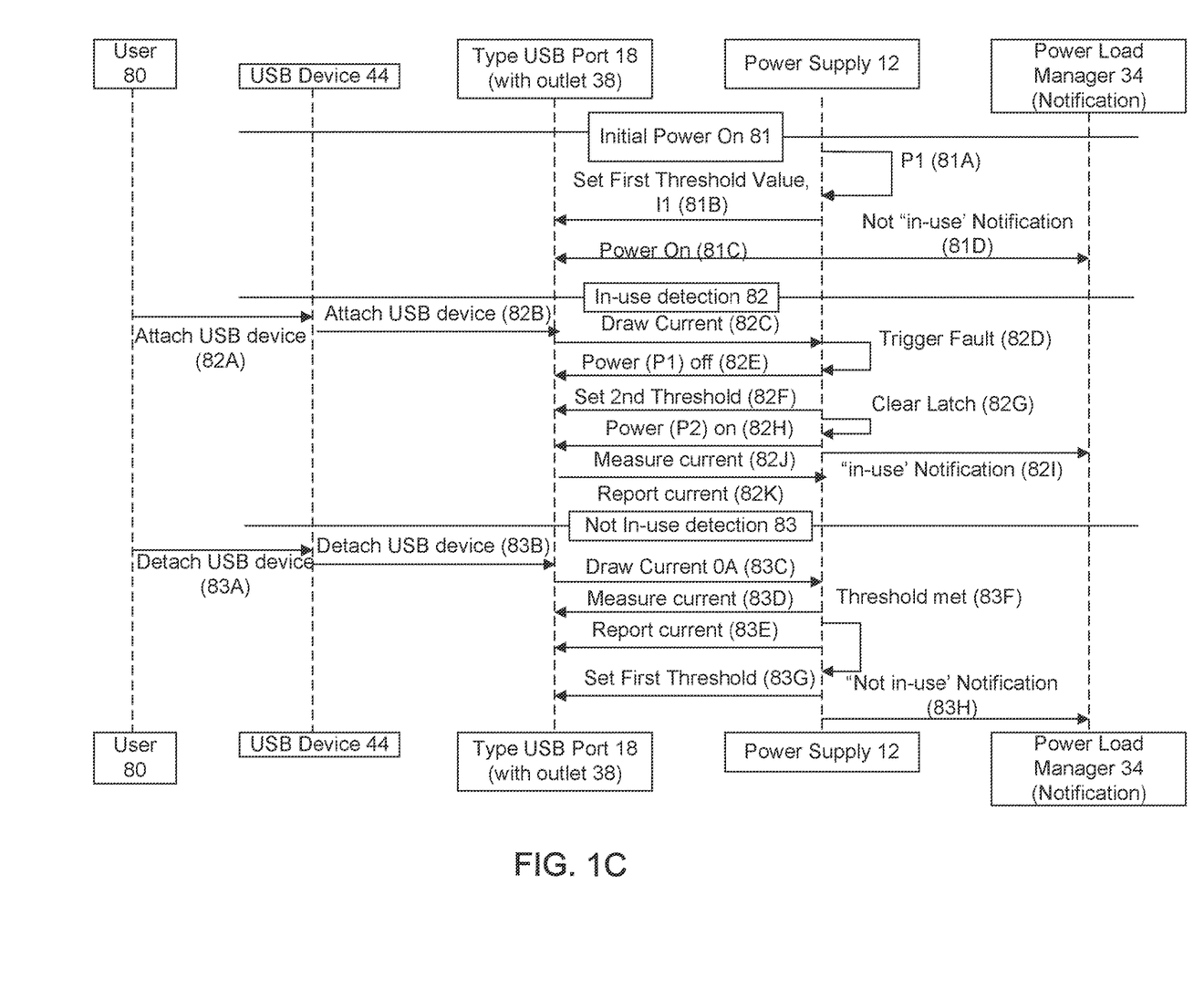
FIG. 1C shows a sequence diagram for power management on an aircraft, according to one aspect of the present disclosure.

FIG. 1C shows sequence diagram for in-use detection of a Type A USB device 44. The sequence diagram shows a Type A USB port 18 which also includes outlet 38. The sequence diagram shows a "notification" block within the power load manager 34, described above with respect to FIGS. 1A-1B. In one aspect, the notification block may be a sub-component within the power load manager 34.

The sequence diagram begins with the "initial power on" block 81. The power supply 12 is initialized (81A), the first threshold value, I1 (e.g., 0.2 A) is set (81B) and the initial power, P1 (e.g., 1 W) is provided to the port (81C). The power load manager 34 is notified or determines that no device is in use (81D).

The "in-use detection block 82" is executed when a Type A, USB device 44 is attached by a user 80, shown as 82A/82B. The attached USB device draws more current than the first threshold value (82C). A fault is triggered (82D) and the initial power, P1 to the port/outlet is temporarily turned off (82E). The second threshold value, I2 (e.g., 2.1 A) is set (82F). The fault is cleared by clearing a latch (not shown) (82G) and the operating power, P2 (e.g., 10.5 W) is provided to the port (82H). The power load manager 34 is notified (or determines) of the in-use detection (82I). While the device is being used, the current drawn by the device is measured (82J) by the port and reported (82K) to the power load manager 34. The measurement and reporting continue while the USB device is in use.

The "not in-use" detection sequence begins in block 83. Before the device is detached, the process continues to measure (82J) and report the current drawn at the port (82K) to the power load manager 34. When the device is detached (83A/83B), there is a drop (e.g., 0 A) in the drawn current (83C). The dropped current is measured (83D) and reported (83E). If the dropped current value meets a threshold value (83F), then the first threshold value, I1 (e.g., 0.2 A) is set (83G). The power load manager 34 receives a notification of "not in-use" detection (83H). The process blocks 82 starts again, when the USB device is attached again to the Type A, USB port.

In one aspect, the sequence process blocks of FIG. 1C are executed by a state machine (not shown). The state machine may be a part of the power load manager 34. In another aspect, the power load manager 34 and the state machine are executed by a seat device, e.g., monitors 42 that provide a Type A USB port/outlet. The adaptive aspects of the present disclosure are not limited to any specific location where the power load manager 34 and the state machine are executed.

In one aspect, methods and systems are provided for a transportation vehicle. One method includes storing (e.g., B52, FIG. 1B) a listening threshold value (e.g., I1) for a Type A, universal serial bus (USB) port (e.g., 18 and/or outlet 38, FIG. 1A) on the transportation vehicle (e.g., 11, FIG. 1A); providing (e.g., B53, FIG. 1B) an initial power (e.g., P1) to the USB port without any attached USB device; in response to attaching a USB device to the USB port, detecting (e.g., B55, FIG. 1B) an increase in current greater than the listening threshold value; temporarily turning off (e.g., B56, FIG. 1B) the initial power to the USB port; setting an operating threshold value (e.g., B57, FIG. 1B), and providing operating power (e.g., B57, FIG. 1B) to the USB port; detecting (e.g., B59, FIG. 1B) a drop in current when the USB device is disconnected; and resetting (e.g., B60, FIG. 1B) the listening threshold value and providing the initial power to the USB port.

The various aspects of the present disclosure solve the inherent challenge of efficiently detecting the use of a Type A USB device. In conventional systems, each port is typically provided the same operational power, whether the port is in-use or not. This becomes challenging for a transportation vehicle, e.g., on an aircraft power availability can be limited, due to weight, space, and other design constraints. The present disclosure solves this challenge by providing a low initial power P1 when a port is not in use, detecting use of a Type A USB device and then providing the operational power P2, which is greater than P1. When a device is detached, the operational power, P2 is reset to the lower initial power, P1. This optimizes overall power consumption and distribution on the transportation vehicle.

Figure 2A:
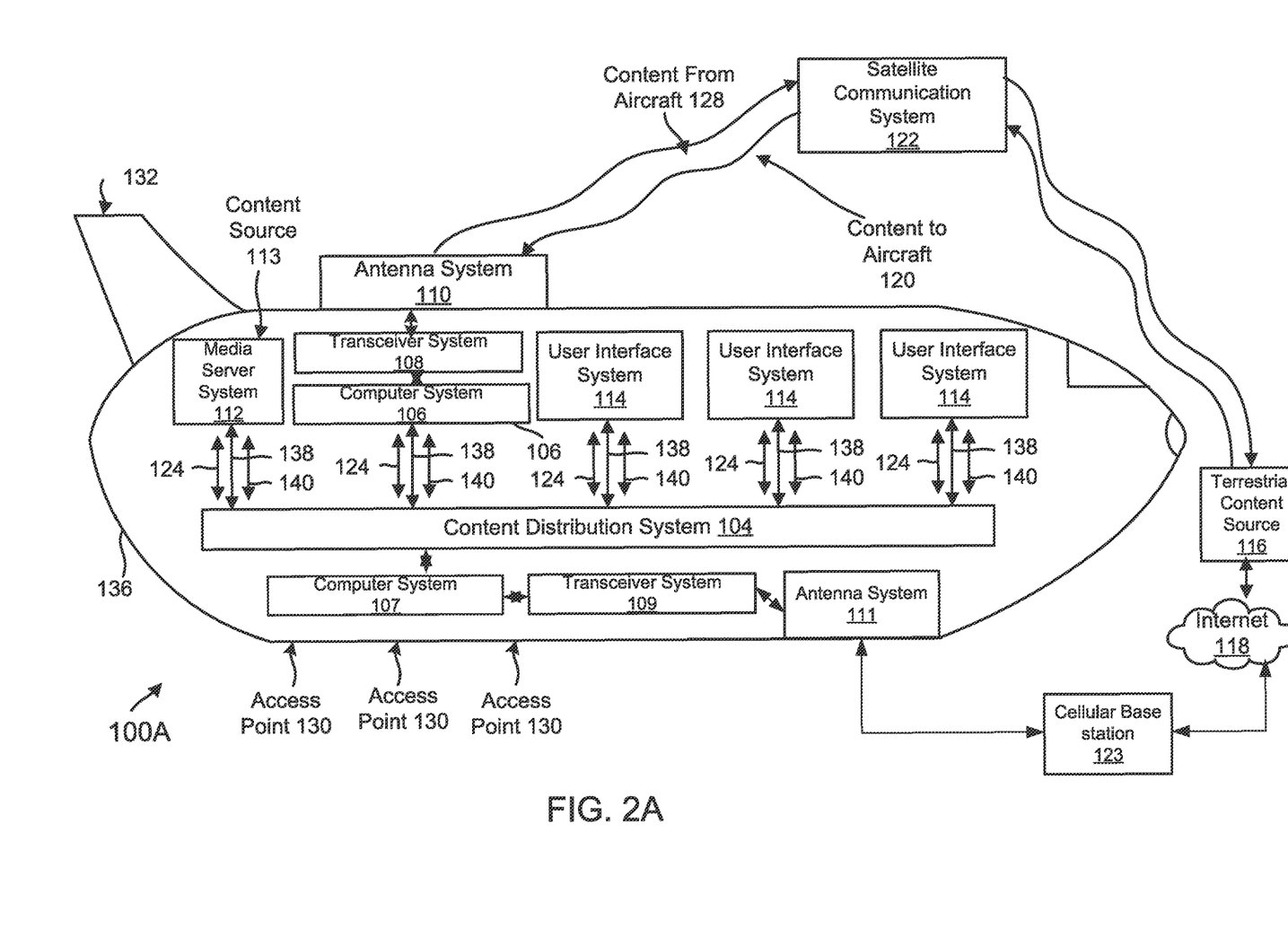
FIG. 2A shows an example of an operating environment for implementing the various aspects of the present disclosure on an aircraft.

Vehicle Information System: FIG. 2A shows an example of a vehicle information system 100A (also referred to as system 100A) that can be configured for installation aboard an aircraft 132 (similar to vehicle 11 of FIG. 1A), according to one aspect of the present disclosure. When installed on an aircraft, system 100A can comprise an aircraft passenger IFE system. System 100A comprises at least one content source 113 and one or more user (or passenger) media client user interface systems (may also be referred to as a seat device/ seatback device) 114 that communicate with a real-time content distribution system 104. The content sources 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content as shown and described herein are not exhaustive and are provided herein for purposes of illustration only and not for purposes of limitation.

The media server system 112 can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or a hard disk drive (HDD) system, of any suitable kind, for storing the preprogrammed content and/or the downloaded content 120. The media server system 112 may stream and/or otherwise transmit data stored on the storage system to content distribution system 104 to be played by a passenger using user interface system 114 (also referred to as a set device or a smart monitor).

For example, one type of content that may be transmitted to user interface system 114 comprises viewing content 124. The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming and/or live wireless video/audio streaming, the viewing content likewise can include two-way communications, such as real-time access to the Internet 118 and/or telecommunications and/or a cellular base station 123 that communicates through an antenna 111 to a transceiver system 109 and a computer system 107. The functionality of computer system 107 is similar to computing system 106 for distributing content using the content distribution system 104 described herein. It is noteworthy that although two antenna systems 110/111 have been shown in FIG. 2A, the adaptive aspects disclosed herein may be implemented by fewer or more antenna systems.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122 or the cellular base station 123.

System 100A can receive content 120 from a selected terrestrial content source 116 and/or transmit (upload) content 128, including navigation and other control instructions, to the terrestrial content source 116. As desired, the terrestrial content source 116 can be configured to communicate with other terrestrial content sources (not shown). The terrestrial content source 116 is shown as a network device that provides access to the Internet 118. Although shown and described as comprising the satellite communication system 122 and the cellular base station 123 for purposes of illustration, the communication system can comprise any conventional type of wireless communication system, such as any wireless communication system and/or an Aircraft Ground Information System (AGIS) communication system.

To facilitate communications with the terrestrial content sources 116, system 100A may also include an antenna system 110 and a transceiver system 108 for receiving the viewing content from the remote (or terrestrial) content sources 116. Transceiver system 108 is preferably configured to both send and receive data to any suitable content source device. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system 108, to a computer system 106 of system 100A. The computer system 106 can provide the received viewing content 124 to the media (or content) server system 112 and/or directly to one or more of the user interface systems 114 including an IFE or a PED, as desired. Although shown and described as being separate systems for purposes of illustration, the computer system 106 and the media server system 112 can be at least partially integrated, and in some aspects comprises a single computer system.

The user interface system 114 may comprise computing terminals/smart monitors in communication with a wireless access point 130, for example, a port that user interface system 114 plugs into. The user interface system 114 provides a display device to view content, for example, a screen having a keyboard or a touchscreen. The user interface system 114 includes a hardware interface to connect to an access point 130 to provide a wired and/or a wireless connection for the user interface system 114 to interface with.

In at least one aspect, the user interface system 114 comprises a software application that a user downloads and installs on a PED to receive and view content via an access point 130, described below in detail. While bandwidth limitation issues may occur in a wired or wireless system on a vehicle, such as an aircraft 132, in general a system bus of the vehicle information 100A system is configured to have sufficient bandwidth to support data transfers for all user interface systems 114 aboard the vehicle, i.e., devices used by passengers.

The user interface system 114 can include an input system (not shown) for permitting the user (or passenger) to communicate with system 100A, such as via an exchange of control signals 138. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124 or for any other reason, payment information likewise can be entered via the input system. The input system can be provided in any conventional manner and typically includes a touch screen, API, a microphone for voice input, one or more switches (or pushbuttons), such as a keyboard or a keypad, and/or a pointing device, such as a mouse, trackball, or stylus.

In one aspect, the user interface system 114 is provided at individual passenger seats of aircraft 132. The user interface system 114 can be adapted to different aircraft and seating arrangements and the adaptive aspects described herein are not limited to any specific seat arrangements or user interface types.

Figure 2B:
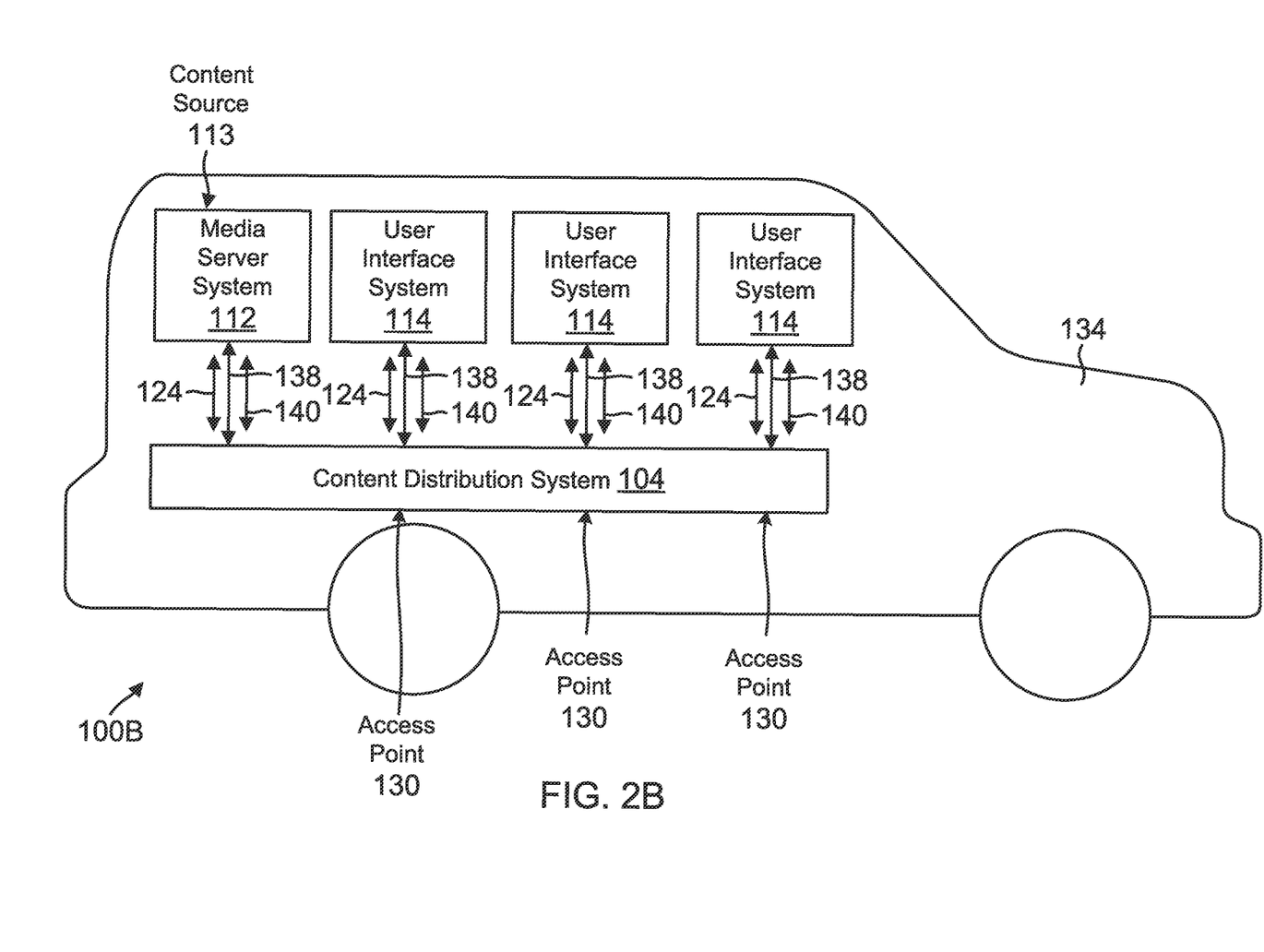
FIG. 2B shows an example of the operating environment on a non-aircraft transportation vehicle type, according to one aspect of the present disclosure.

FIG. 2B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 2A and for brevity are not described again.

Figure 3:
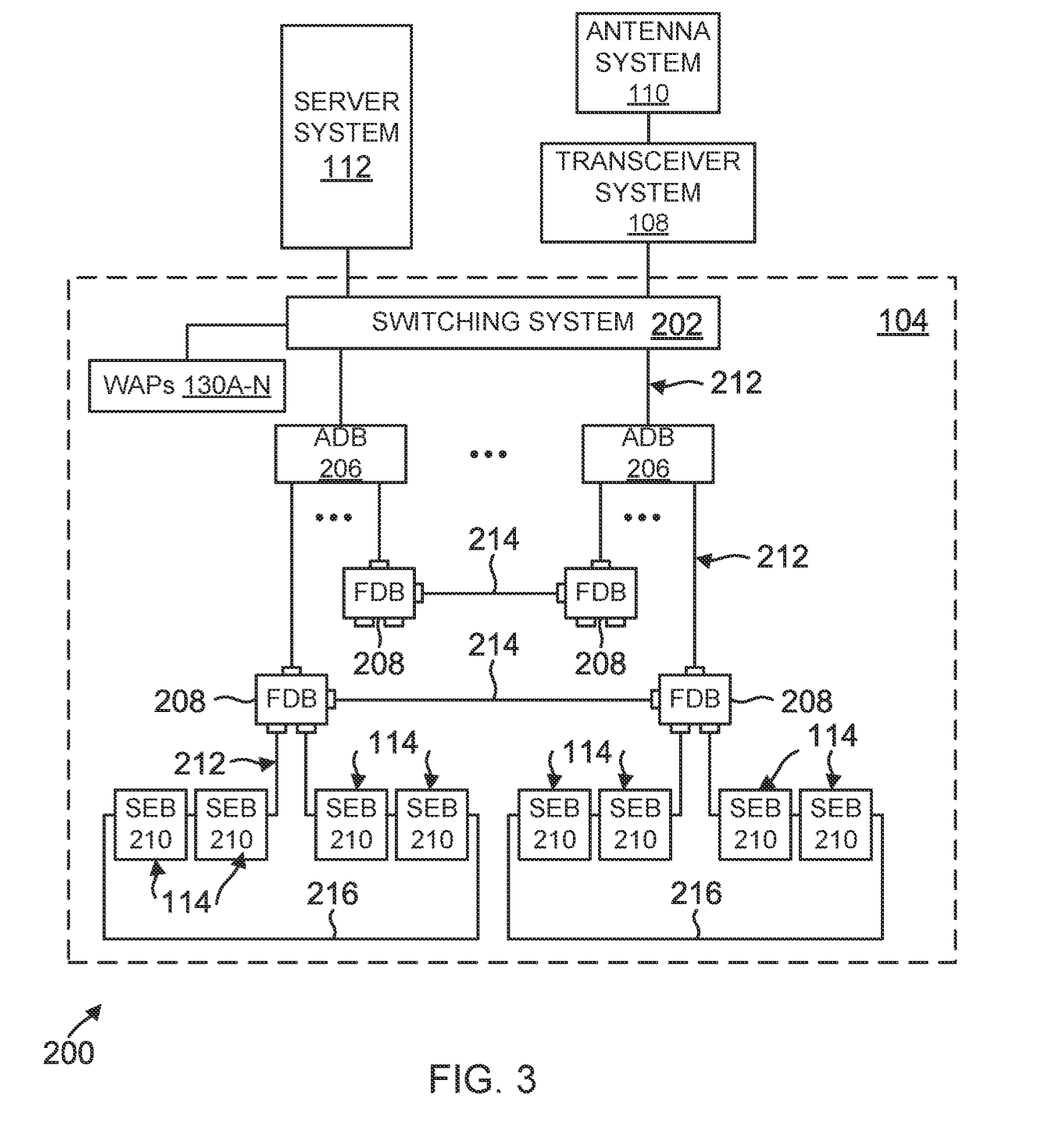
FIG. 3 shows an example of a content distribution system on an aircraft, used according to one aspect of the present disclosure.

Content Distribution System: FIG. 3 illustrates an example of the content distribution system 104 for the vehicle information system 200 (similar to 100A/100B), according to one aspect of the present disclosure. The content distribution system 104 couples, and supports communication between the server system 112, and the plurality of media client systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16.

Preferably configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. In some aspects, the content distribution system 104 may comprise a fiber optic network. To achieve high data transfer rates in a wireless communications environment, free-space optics (or laser) technology, millimeter wave (or microwave) technology, and/or Ultra-Wideband (UWB) technology can be utilized to support communications among the various system resources, as desired, for example, a 5G network.

As illustrated in FIG. 3, the distribution system 104 can be provided as a plurality of area distribution boxes (ADBs) 206, a plurality of floor disconnect boxes (FDBs) 208, and a plurality of seat electronics boxes (SEBs) (and/or VSEBs and/or PSEBs) 210 being configured to communicate in real time via a plurality of wired and/or wireless communication connections 212.

The distribution system 104 likewise can include a switching system 202 for providing an interface between the distribution system 104 and the server system 112. The switching system 202 can comprise a conventional switching system, such as an Ethernet switching system, and is configured to couple the server system 112 with the ADBs 206. Each of the ADBs 206 is coupled with, and communicates with, the switching system 202. In addition, the distribution system 104 includes one or more WAPs (130A to 130N) connected in communication with the switch system 202 for wireless distribution of content to user interface systems 114.

Each of the area distribution boxes 202, in turn, is coupled with, and communicates with, at least one FDB 208. Although the ADBs 206 and the associated FDBs 208 can be coupled in any conventional configuration, the associated FDBs 208 preferably are disposed in a star network topology about a central ADB 206 as illustrated in FIG. 3. Each FDB 208 is coupled with, and services, a plurality of daisy-chains of SEBs 210. The SEBs 210, in turn, are configured to communicate with the user interface system 114. Each SEB 210 can support one or more of the user interface systems 114.

The switching systems 202, the ADBs 206, the FDBs 208, the SEBs (and/or VSEBs, and/or PSEBs) 210, the antenna system 110 (and/or 111, FIG. 2A), the transceiver system 108 (and/or 109, FIG. 2A), the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The content distribution system 104 can include at least one FDB internal port bypass connection 214 and/or at least one SEB loopback connection 216. Each FDB internal port bypass connection 214 is a communication connection 212 that permits FDBs 208 associated with different ADBs 206 to directly communicate. Each SEB loopback connection 216 is a communication connection 212 that directly couples the last SEB 210 in each daisy-chain of SEBs 210 for a selected FDB 208 as shown in FIG. 3. Each SEB loopback connection 216 therefore forms a loopback path among the daisy-chained SEBs 210 coupled with the relevant FDB 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 4:
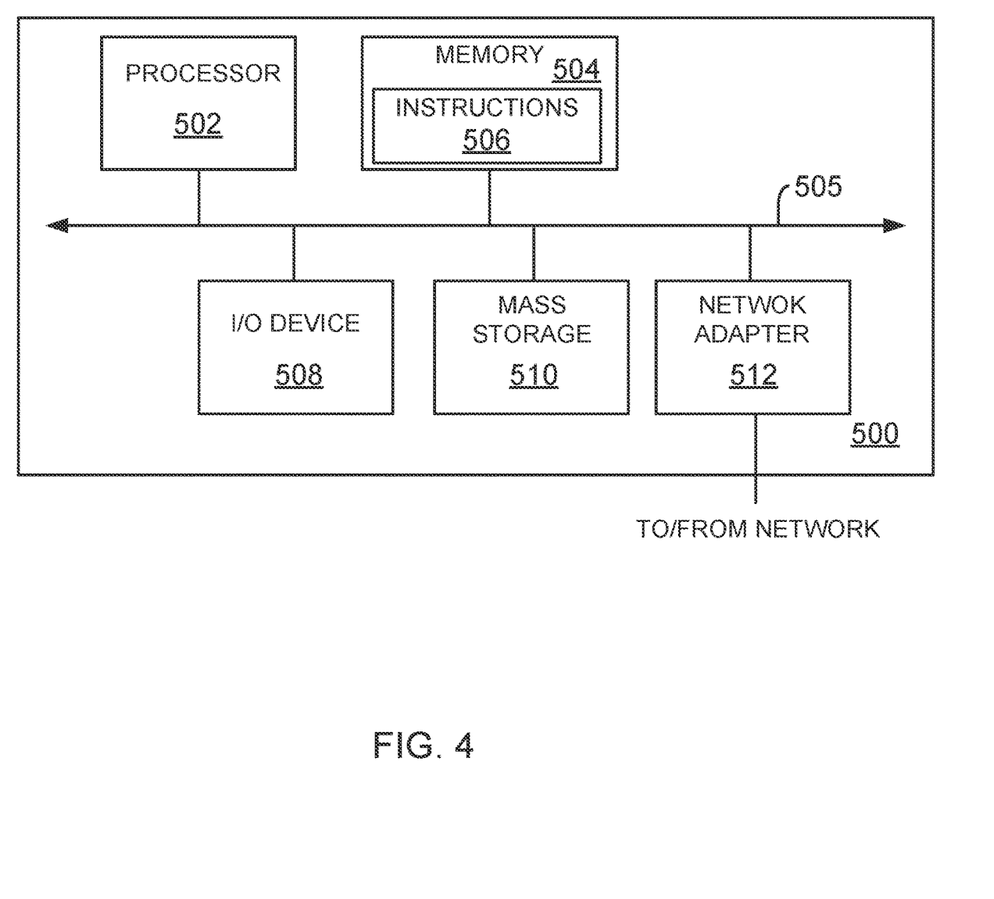
FIG. 4 shows a block diagram of a computing system, used according to one aspect of the present disclosure.

Processing System: FIG. 4 is a high-level block diagram showing an example of the architecture of a processing system 500 that may be used according to one aspect. The processing system 500 can represent any computer system disclosed herein, for example, terrestrial content source 116, satellite communication system 122, computer system 106, media server system 112, user interface system 114, WAP 130, or any user device that attempts to interface with a vehicle computing device. Note that certain standards and well-known components which are not germane to the present aspects are not shown in FIG. 4.

The processing system 500 includes one or more processor(s) 502 and memory 504, coupled to a bus system 505. The bus system 505 shown in FIG. 4 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement the power load module 34, and/or the process blocks of FIGS. 1B-1C described above.

Also connected to the processors 502 through the bus system 505 are one or more internal mass storage devices 510, and a network adapter 512. Internal mass storage devices 510 may be or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network) and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for power management on a transportation vehicle have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
    configuring a listening threshold value for a Type A, universal serial bus (USB) port on a transportation vehicle;
    providing an initial power to the USB port without any attached USB device;
    in response to attaching a USB device to the USB port, detecting an increase in current at the USB port greater than the listening threshold value;
    temporarily turning off the initial power to the USB port in response to detecting the increase in current greater than the listening threshold value;
    setting an operating threshold value, and providing operating power to the USB port;
    detecting a drop in current at the USB port below a disconnect threshold value when the USB device attached to the USB port becomes is disconnected from the USB port; and
    resetting the listening threshold value and providing the initial power to the USB port in response to detecting the drop.

2. The method of claim 1, wherein the listening threshold value is a first current value.

3. The method of claim 2, wherein the operating threshold value is a second current value that is greater than the listening threshold value.

4. The method of claim 1, wherein the operating power is greater than the initial power.

5. The method of claim 1, further comprising: monitoring a current drawn by the USB device, while the USB device is in use; and detecting a drop in the current drawn value below a threshold to determine that the USB device is detached.

6. The method of claim 1, wherein the transportation vehicle is an aircraft.

7. The method of claim 1, wherein the transportation vehicle is not an aircraft.

8. A non-transitory machine-readable storage medium having stored thereon instructions for performing a method, comprising machine executable code which, when executed by a machine, causes the machine to:
    configure a listening threshold value for a Type A, universal serial bus (USB) port on a transportation vehicle;
    provide an initial power to the USB port without any attached USB device;
    in response to attaching a USB device to the USB port, detect an increase in current at the USB port greater than the listening threshold value;
    temporarily turn off the initial power to the USB port in response to detecting the increase in current greater than the listening threshold value;
    set an operating threshold value, and providing operating power to the USB port;
    detecting a drop in current at the USB port below a disconnect threshold value when the USB device attached to the USB port becomes disconnected from the USB port; and
    reset the listening threshold value and providing the initial power to the USB port in response to detecting the drop.

9. The non-transitory machine-readable storage medium of claim 8, wherein the listening threshold value is a first current value.

10. The non-transitory machine-readable storage medium of claim 8, wherein the operating threshold value is a second current value that is greater than the listening threshold value.

11. The non-transitory machine-readable storage medium of claim 8, wherein the operating power is greater than the initial power.

12. The non-transitory machine-readable storage medium of claim 8, wherein the machine executable code which when executed by the at least one machine, further causes the at least one machine to: monitor a current drawn by the USB device, while the USB device is in use; and detect a drop in the current drawn value below a threshold to determine that the USB device is detached.

13. The non-transitory machine-readable storage medium of claim 8, wherein the transportation vehicle is an aircraft.

14. The non-transitory machine-readable storage medium of claim 8, wherein the transportation vehicle is not an aircraft.

15. A system, comprising:
- a memory containing non-transitory machine readable storage medium comprising machine executable code having stored thereon instructions; and
- a processor of a first node coupled to the memory, the processor configured to execute the machine executable code to: configure a listening threshold value for a Type A, universal serial bus (USB) port on a transportation vehicle;
- provide an initial power to the USB port without any attached USB device;
- in response to attaching a USB device to the USB port, detect an increase in current at the USB port greater than the listening threshold value;
- temporarily turn off the initial power to the USB port in response to detecting the increase in current greater than the listening threshold value;
- set an operating threshold value, and providing operating power to the USB port;
- detecting a drop in current at the USB port below a disconnect threshold value when the USB device attached to the USB port becomes is disconnected from the USB port; and
- reset the listening threshold value and providing the initial power to the USB port in response to detecting the drop.

16. The system of claim 15, wherein the listening threshold value is a first current value.

17. The system of claim 15, wherein the operating threshold value is a second current value that is greater than the listening threshold value.

18. The system of claim 15, wherein the operating power is greater than the initial power.

19. The system of claim 15, wherein the machine executable code further causes to:
- monitor a current drawn by the USB device, while the USB device is in use; and
- detect a drop in the current drawn value below a threshold to determine that the USB device is detached.

20. The system of claim 15, wherein the transportation vehicle is an aircraft.

* * * * *